(12) United States Patent
Matsumoto

(10) Patent No.: US 7,860,949 B2
(45) Date of Patent: Dec. 28, 2010

(54) COMMUNICATION TERMINAL

(75) Inventor: Kazuhiko Matsumoto, Minato-ku (JP)

(73) Assignee: Ziosoft, Inc., Tokyo (JP)

( * ) Notice: Subject to any disclaimer, the term of this patent is extended or adjusted under 35 U.S.C. 154(b) by 1546 days.

(21) Appl. No.: 11/197,154

(22) Filed: Aug. 4, 2005

(65) Prior Publication Data

US 2006/0123266 A1  Jun. 8, 2006

(30) Foreign Application Priority Data

Dec. 8, 2004  (JP) .............................. 2004-355094

(51) Int. Cl.
G06F 15/16  (2006.01)
G06F 17/60  (2006.01)
G06F 17/24  (2006.01)

(52) U.S. Cl. .................. 709/219; 709/201; 709/202; 709/203; 705/39; 705/40; 715/500; 715/513

(58) Field of Classification Search ......... 709/217–219, 709/201–203; 705/39–40; 715/500, 513
See application file for complete search history.

(56) References Cited

U.S. PATENT DOCUMENTS

| 6,081,750 | A  | * | 6/2000 | Hoffberg et al. ............... 700/17 |
| 2003/0225691 | A1 | * | 12/2003 | Ruellan et al. ................. 705/40 |
| 2004/0174567 | A1 | * | 9/2004 | Abe et al. ..................... 358/2.1 |
| 2004/0205568 | A1 | * | 10/2004 | Breuel et al. ................. 715/513 |
| 2005/0063596 | A1 | * | 3/2005 | Yomdin et al. ............... 382/232 |

FOREIGN PATENT DOCUMENTS

| JP | 11-175271 | | 7/1999 |
| JP | 2001-260453 | | 9/2001 |
| JP | 2002-268832 | | 9/2002 |
| JP | 2002-352219 | | 12/2002 |
| JP | 2003178305 | A * | 6/2003 |
| JP | 2004-180923 | | 7/2004 |

OTHER PUBLICATIONS

Shuanhu Wu and Hong Yan; Microarray Image Processing Based on Clustering and Morphological Analysis; 2003; ACM; 19; 1-20.*
Märkel, Steffen and Spikermann, Axel: "Distributed Visualization: How to improve the quality of 3D medical volume rendering at almost no costs", Proceedings of EuroPacs '98, pp. 225-228, Barcelona, Spain, Oct. 1998.

* cited by examiner

*Primary Examiner*—Ashok B Patel
*Assistant Examiner*—Evans Desrosiers
(74) *Attorney, Agent, or Firm*—Pearne & Gordon LLP

(57) ABSTRACT

A client terminal which uses image data processed based on an image processing request sent to an image processing server is connected via a network. The communication terminal includes a communication state detecting section which detects the communication state with the image processing server, and an image processing section which detects an abnormality of the communication state and executes processing for the image processing request.

18 Claims, 19 Drawing Sheets

POST-PROCESSING

VOLUME DATA PROCESSING + POST-PROCESSING

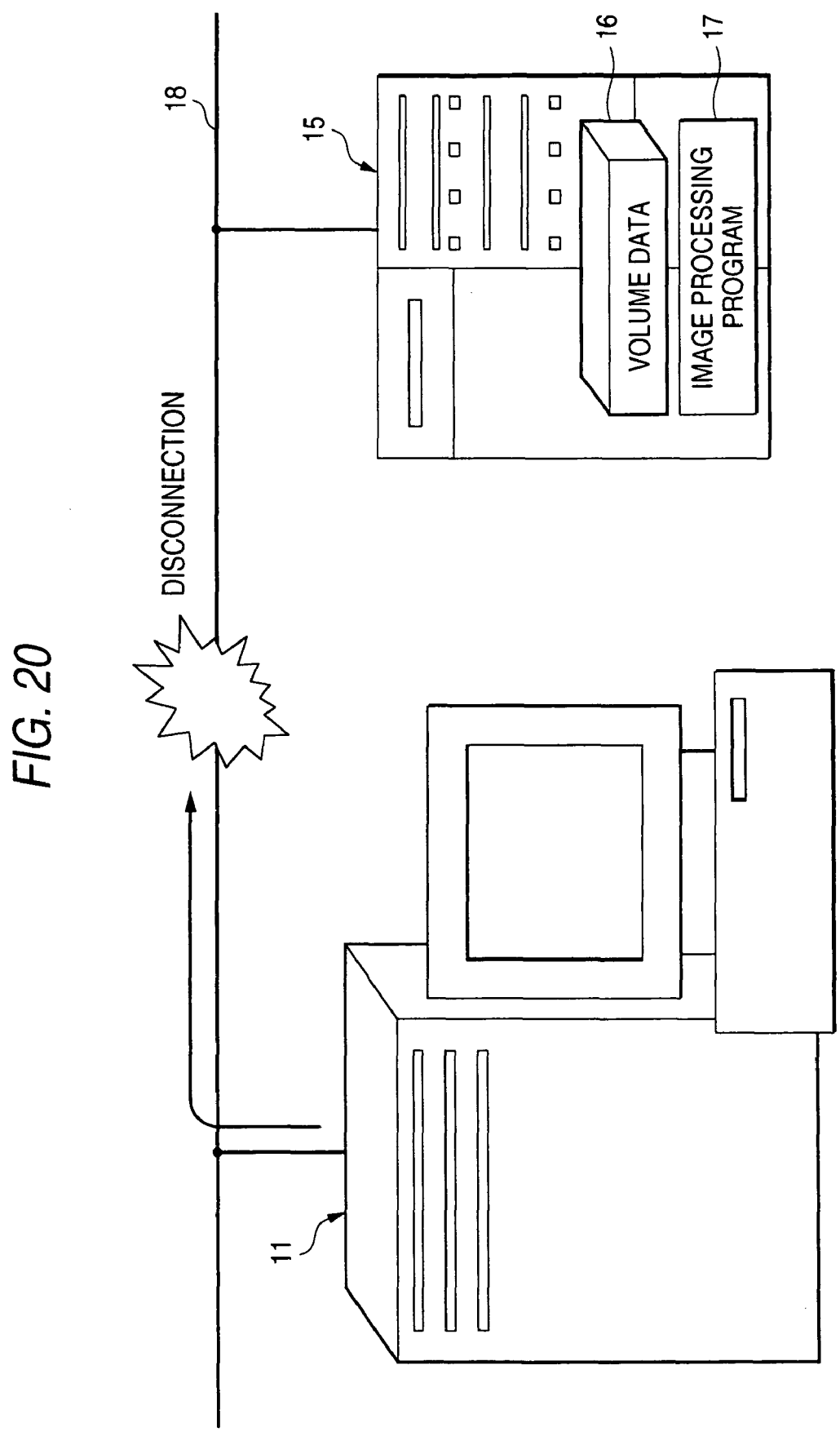

US 7,860,949 B2

COMMUNICATION TERMINAL

This application Claims foreign priority based on Japanese Patent application No. 2004-355094, filed Dec. 8, 2004, the contents of which is incorporated herein by reference in its entirety.

BACKGROUND OF THE INVENTION

1. Field of the Invention

This invention relates to a communication terminal which uses an image data processed based on an image processing request that is sent to an image processing server connected via a communication line.

2. Description of the Related Art

Hitherto, research and development on an image diagnosis apparatus such as CT (computed tomography) and MRI (magnetic resonance imaging), and a three-dimensional medical image technology using an image provided by the image diagnosis apparatus have been conducted. Particularly, an image diagnosis based on volume data processing is widely conducted. An enormous calculation amount is required to perform volume data processing, and therefore in some cases a powerful image processing server on a network has been made to perform calculation.

FIG. 16 shows an image processing system wherein a client terminal 11 and an image processing server 15 are connected via a network 18, and volume data is processed in the image processing server 15. When a job (image processing request) is transmitted from the client terminal 11 via the network 18 to the image processing server 15, the image processing server 15 calls up the volume data corresponding to the job of the client terminal 11 from a database 85 storing volume data, and performs predetermined image processing. The processing result image is transferred via the network 18 to the client terminal 11, and is displayed on a display of the client terminal 11.

FIG. 17 shows a flow of data from the client terminal 11 to the image processing server 15 in the image processing system in the related art at normal time. Since the client terminal 11 does not have sufficient resources for image processing, an image processing request for an image to be displayed on the client terminal 11 is transmitted via the network 18 to the image processing server 15.

FIG. 18 shows a flow of data from the image processing server 15 to the client terminal 11 in the image processing system in the related art at normal time. The image processing server 15 stores volume data 16 which is an image data of the inside of a human body photographed in a CT apparatus, etc., and an image processing program 17 for performing image processing of volume rendering, etc., on the volume data 16.

The image processing server 15 performs image processing responsive to the image processing request from the client terminal 11, and transmits the processing result image to the client terminal 11. Then the client terminal 11 displays the received processing result image on a display 14.

FIG. 19 is a flowchart for executing a job in the image processing system in the related art.

For example, if the user wants to see the CT image of a predetermined part of a human body, user entry is performed in which the user specifies the predetermined part (step S51) at the client terminal 11, and a job is generated (step S52). The client terminal 11 starts processing of the job (step S53), and transmits the job via the network 18 to the image processing server 15 (step S54).

The image processing server 15 calls up the data corresponding to the job from the volume data 16, generates an image (step S55), and transmits the generated image via the network 18 to the client terminal 11 (step S56). The client terminal 11 receives the image (step S57), displays the image on the display 14, and the job is completed (step S58). (For example, refer to "Distributed Visualization. How to improve the quality of medical volume rendering at almost no costs.", Markle, Steffen; Spikermann, Axel: Proceedings of EuroPACS '98, pp. 225-228, Barcelona, Spain, October 1998.)

However, in the image processing system in the related art, when communication between the client terminal 11 and the image processing server 15 is not normally performed, no action can be taken by the client terminal 11 and work may be interrupted.

FIG. 20 shows a state when communication is disconnected in the image processing system in the related art. FIG. 20 shows a state in which the network 18 is disconnected; one such example is the case where the client terminal 11 is a wireless terminal and moves to the outside of the communication range with the image processing server 15. In such a case, the client terminal 11 cannot access the volume data 16 in the image processing server 15, and image processing and image display work are interrupted.

SUMMARY OF THE INVENTION

It is therefore an object of the invention to provide a communication terminal which enables to continue work regardless of the communication state with an image processing server.

In the first aspect of the invention, a communication terminal which communicates an image data via a communication line, the image data processed in an image processing server based on an image processing request sent to the image processing server, the communication terminal comprises a communication state detecting section which detects a communication state between the communication terminal and the image processing server, and an image processing section which detects an abnormality of the communication state, and executes an image processing for the image processing request when the abnormality is detected.

According to the configuration, the image processing section is provided which detects the abnormality of the communication state, and executes an image processing for the image processing request when the abnormality is detected. Accordingly, if a breakdown of communications with the image processing server occurs in a client-server system, image processing in the client terminal is possible, so that the user can continue work regardless of the communication state.

The communication terminal of the first aspect of the invention further comprises a data storage section which stores the image data.

In the communication terminal of the first aspect of the invention, the stored image data includes an intermediate data which is an intermediate format of an image calculated from a volume data. In the communication terminal of the first aspect of the invention, the image processing section executes the image processing using the intermediate data stored in the data storage section. In the communication terminal of the first aspect of the invention, the image processing section selects a similar image based on the intermediate data by which an image similar to the image data is obtained. In the communication terminal of the first aspect of the invention, the image processing section performs a LUT (Look Up Table) transformation or a WL/WW (Window Level/Window Width) transformation. In the communication terminal of the first aspect of the invention, the image processing section performs an image measurement processing. In the communication terminal of the first aspect of the invention, the image processing section performs an affine transformation.

In the communication terminal of the first aspect of the invention, the image processing section executes a volume data processing. In the communication terminal of the first aspect of the invention, the image processing section executes a volume rendering. The communication terminal of the first aspect of the invention further comprises a volume data generating section which generates a volume data from the intermediate data for executing the volume data processing. In communication terminal of the first aspect of the invention, the data storage section includes a volume data storage section which stores a volume data being compressed among the image data, and the image processing section executes a volume data processing using the stored volume data.

Further, in the second aspect of the invention, there is provided a computer readable medium having a set of instructions for controlling a communication terminal which communicates an image data via a communication line, the image data processed in an image processing server based on an image processing request sent to the image processing server, the set of instructions comprises (a) detecting a communication state between the communication terminal and the image processing server, (b) detecting an abnormality of the communication state, and (c) executing an image processing for the image processing request when the abnormality is detected.

BRIEF DESCRIPTION OF THE DRAWINGS

FIG. 20 shows a state when communication is disconnected in the image processing system in a related art.

DESCRIPTION OF THE PRFERED EMBODIMENTS

First Embodiment

Figure 1:
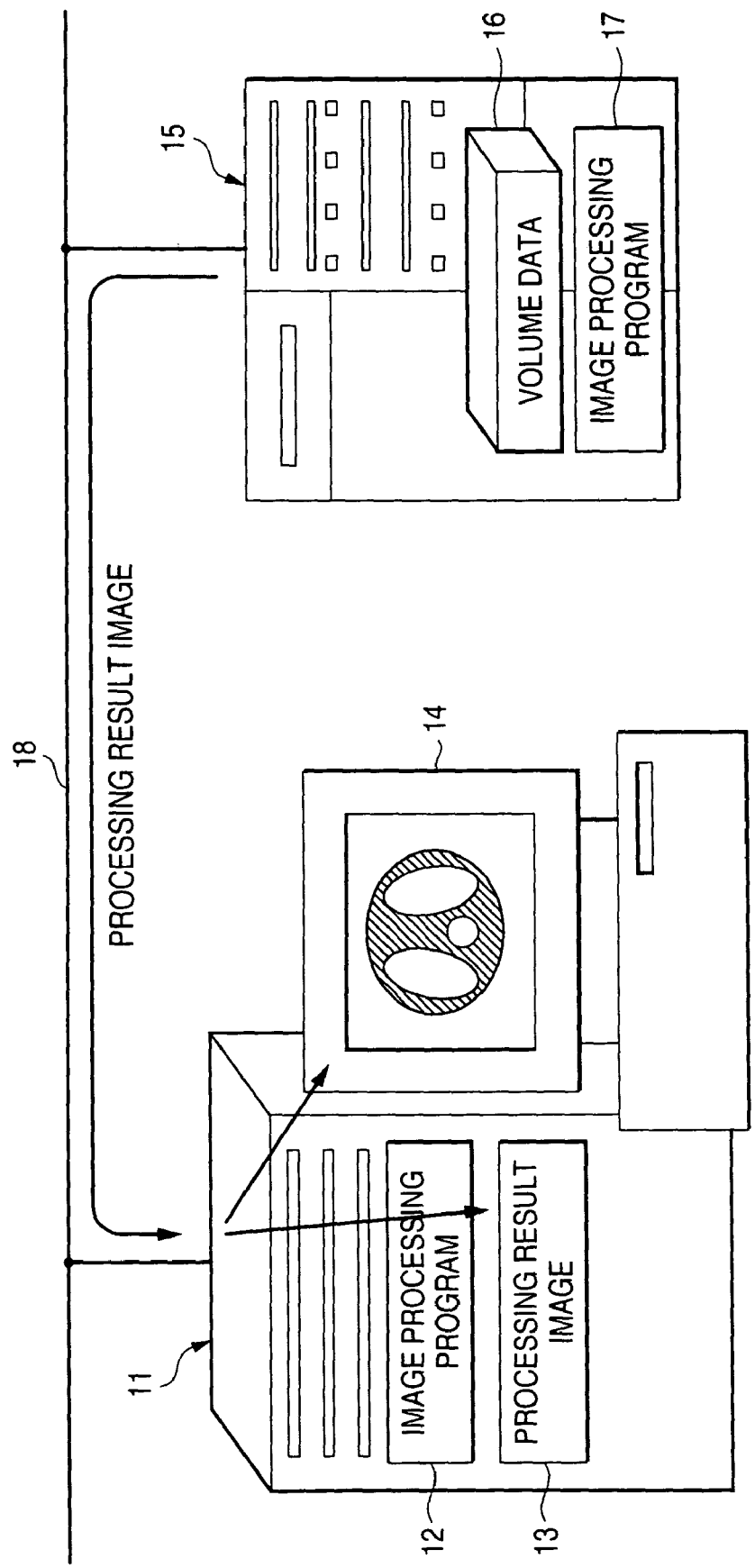
FIG. 1 shows a state in which a processing result image is transmitted from an image processing server 15 when the communication state is normal in an image processing system according to a first embodiment of the invention.

FIG. 1 shows a state in which a processing result image is transmitted from an image processing server 15 when the communication state is normal in an image processing system according to a first embodiment of the invention. An image processing system wherein a client terminal 11 and an image processing server 15 are connected via a network 18 will be discussed. The client terminal 11 displays an image using intermediate data that is processed based on an image processing request sent to the image processing server 15.

The image processing server 15 performs image processing such as volume rendering for volume data 16 in accordance with an image processing program 17 in response to the image processing request received from the client terminal 11. The image processing server 15 transmits a processing result image to the client terminal 11 via the network 18. A plurality of computers may be used to perform distributed processing as the image processing server 15. The client terminal 11 is a PC terminal, etc., operated by the user, and is a computer which requests the image processing server 15 to perform image processing.

The client terminal 11 receives the processing result image provided by the image processing server 15, and displays the processing result image on a display 14 while storing the processing result image or intermediate data in a cache 13. The processing result image refers to an image actually displayed on the display 14. The intermediate data is often represented as two-dimensional data, such as CT value, in an intermediate format of the image calculated from the volume data. Further, the data used in the client terminal 11 in the past and stored is called a cache image, and the cache image includes the intermediate data and the processing result image.

Second Embodiment

Figure 2:
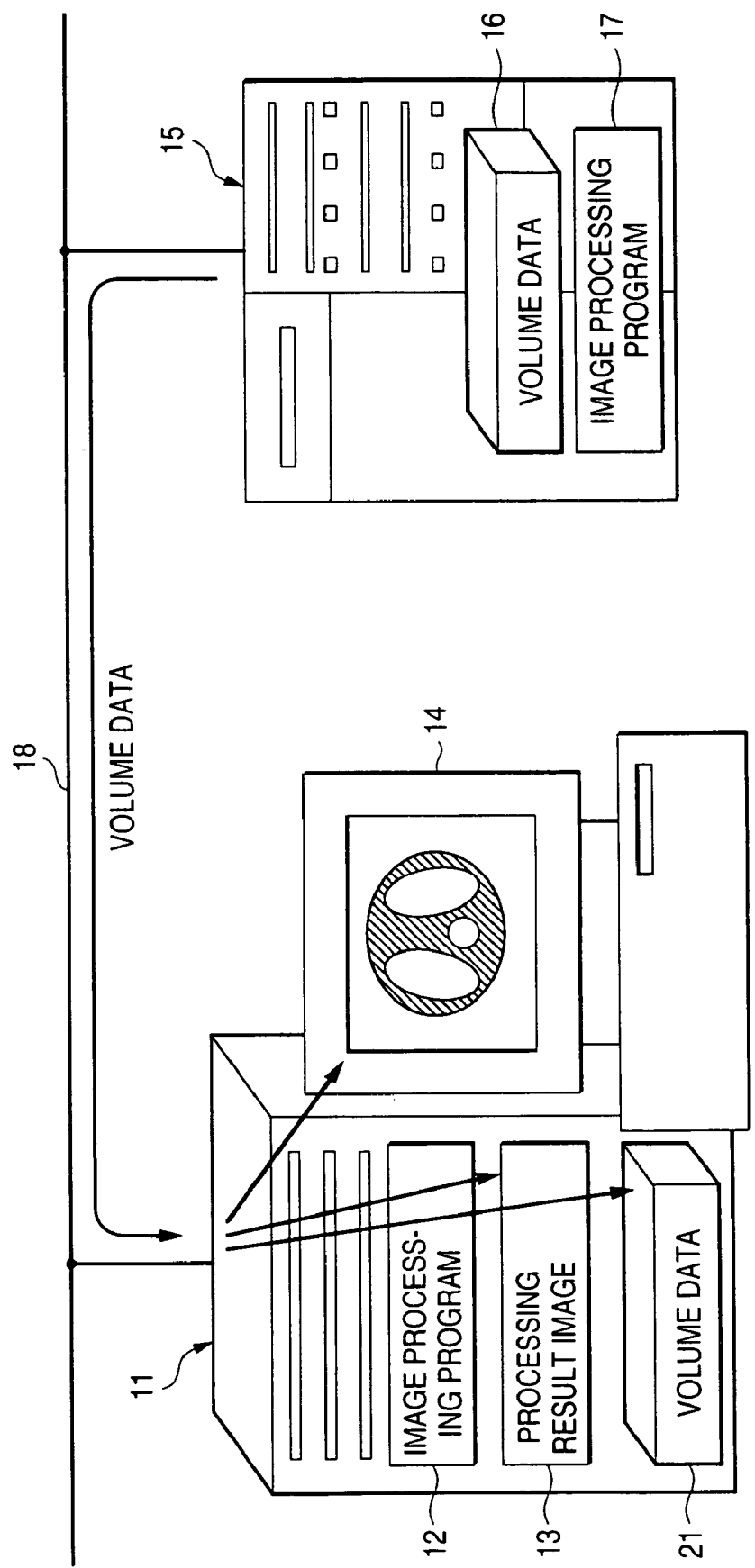
FIG. 2 shows a state in which volume data is transmitted from an image processing server 15 when the communication state is normal in an image processing system according to a second embodiment of the invention.

FIG. 2 shows a state in which volume data is transmitted from an image processing server 15 when the communication state is normal in an image processing system according to a second embodiment of the invention. A client terminal 11 receives a processing result image 13 from the image processing server 15, and also receives and saves a part of volume data 16 in the background. The resolution of volume data 21 which is saved in the client terminal 11 can also be lowered in response to the memory amount, etc., of the client terminal 11. Particularly, when a slice image of the volume data 16 is displayed, it is preferable that the volume data corresponding to the slice image is stored. Furthermore, compressed volume data may be stored in the client terminal 11.

Figure 3:
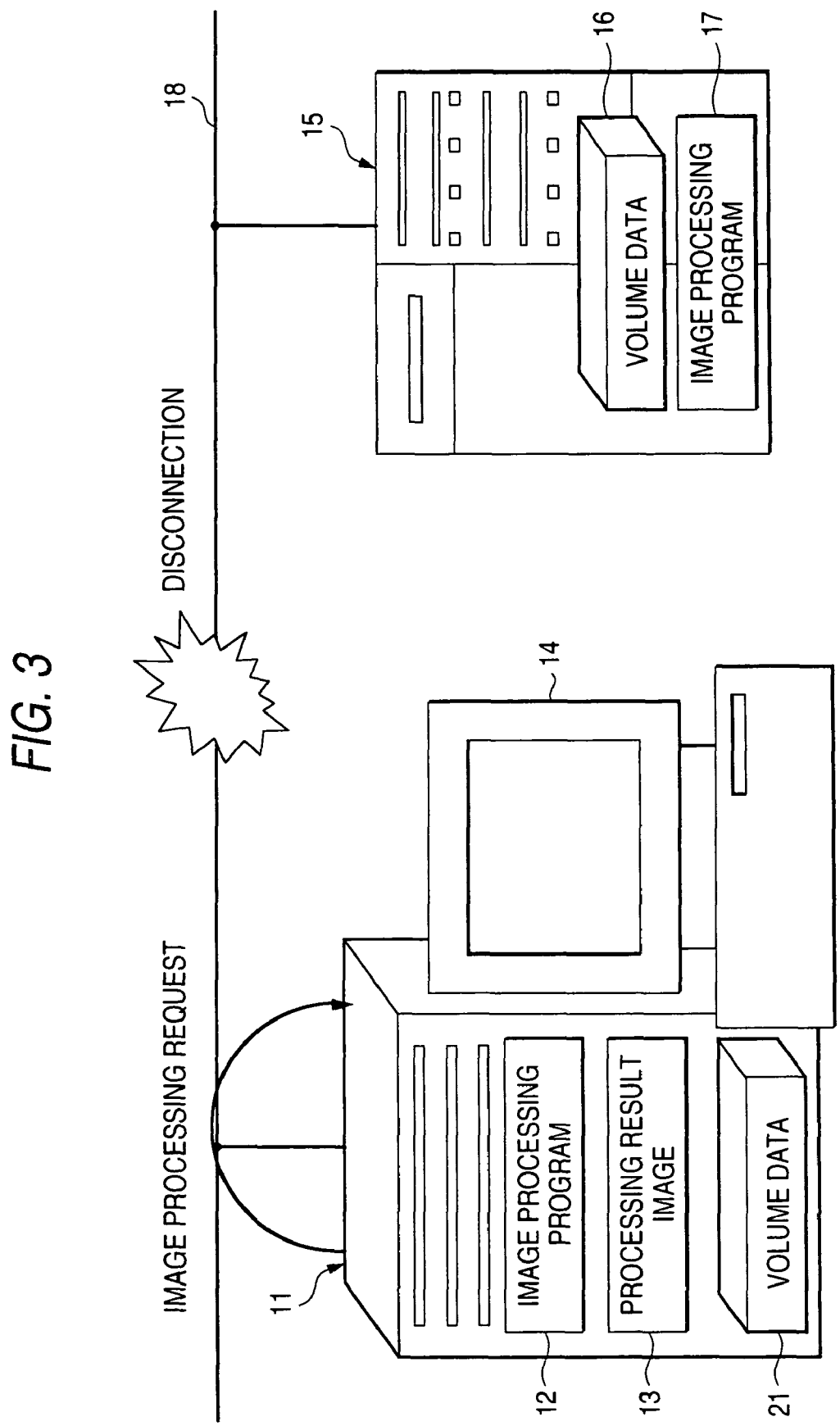
FIG. 3 shows a state in which an image processing request of the client terminal 11 is not transmitted to the image processing server 15 when communication is disconnected in the image processing system according to a second embodiment of the invention.

FIG. 3 shows a state in which an image processing request of the client terminal 11 is not transmitted to the image processing server 15 when communication is disconnected in the image processing system according to the second embodiment of the invention. In the embodiment, the client terminal 11 detects disconnection of communication (abnormality in communication state), and switches to process in the client terminal 11.

The client terminal 11 saves the image data processed before the disconnection of communication, the intermediate data and the volume data 21 transferred during the communication with the image processing server 15, whereby the client terminal 11 can continue processing in the possible range even when a communication is disconnected. This function is effective particularly when the client terminal 11 is wirelessly connected to the image processing server 15.

Figure 4:
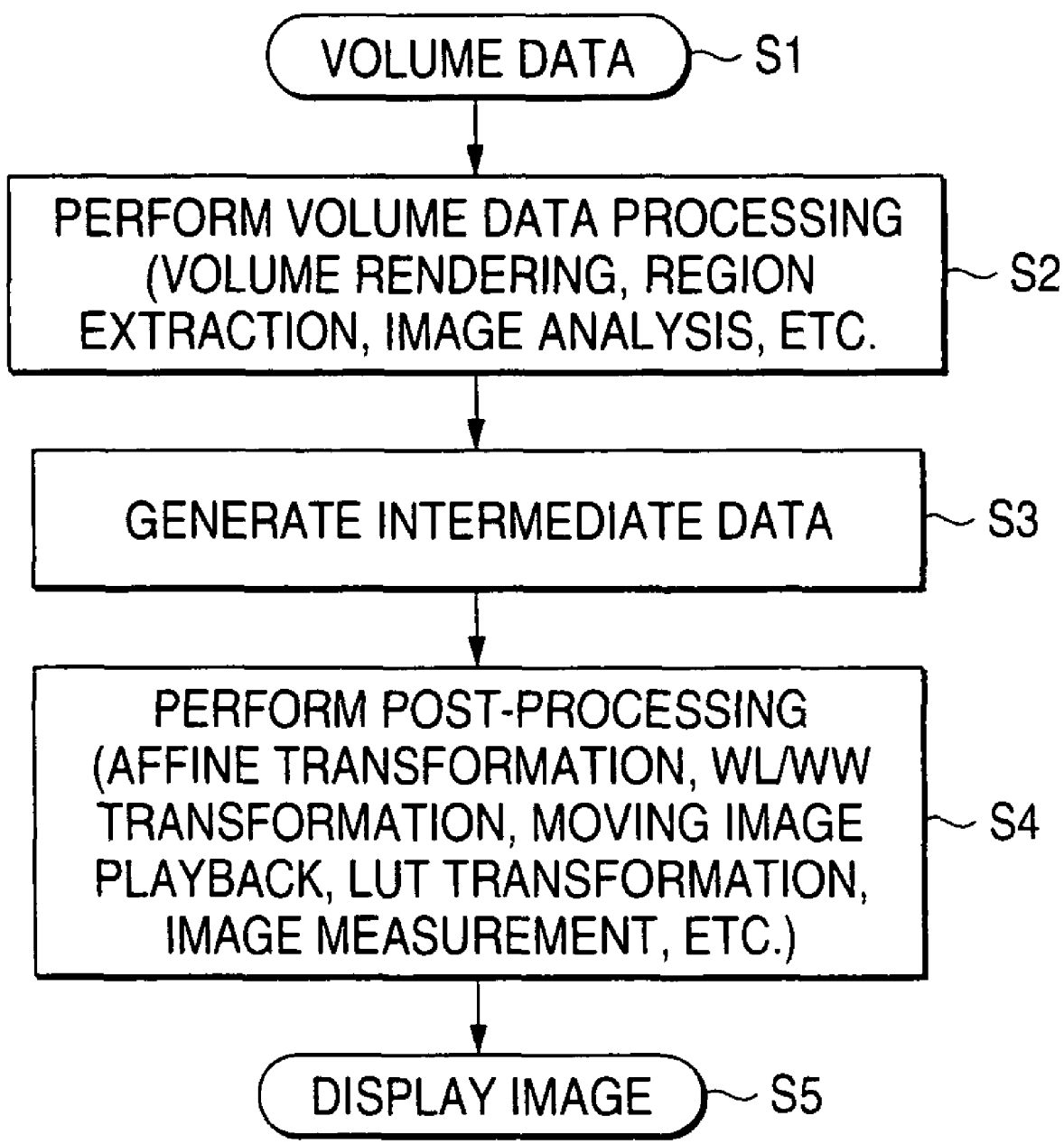
FIG. 4 shows a flow of volume data processing in the image processing systems of first and second embodiments of the invention.

FIG. 4 shows a flow of volume data processing in the image processing systems of the first and second embodiments of the invention. Volume data is mainly stored in the image processing server 15 (step S1). The image processing server 15 performs volume data processing for the volume data in accordance with the image processing program (step S2). The volume data processing includes volume rendering, region extraction, image analysis, etc., and intermediate data is generated as the result of the volume data processing (step S3). For example, representative volume rendering includes ray casting, MIP (maximum intensity projection), MPR (multi planar reconstruction), and CPR (curved multi planar reconstruction). The volume data processing is a processing that requires volume data.

Post-processing is performed for the intermediate data in the client terminal 11 (step S4). The post-processing includes affine transformation, WL/WW transformation, moving image playback, LUT transformation, image measurement, text display, image combining, etc. A display image is generated by the post-processing (step S5), which is displayed on the display 14 of the client terminal 11.

The post-processing is a processing that can be performed only with intermediate data without the need of volume data.

The affine transformation is an image transformation that can be represented by matrix transformation of scale-up, rotation, scale-down, move, etc. The WL/WW transformation (window/level transformation) is a transformation processing generally performed with a medical image for adjusting the contrast and brightness so as to adjust the CT value (intermediate data value) usually provided as a 4096 gray scale to a 256 gray scale for display. The LUT transformation (look-up table transformation) is a transformation processing based on a transformation table so as to color a specific CT value range and enhance contrast partially.

Figure 5:
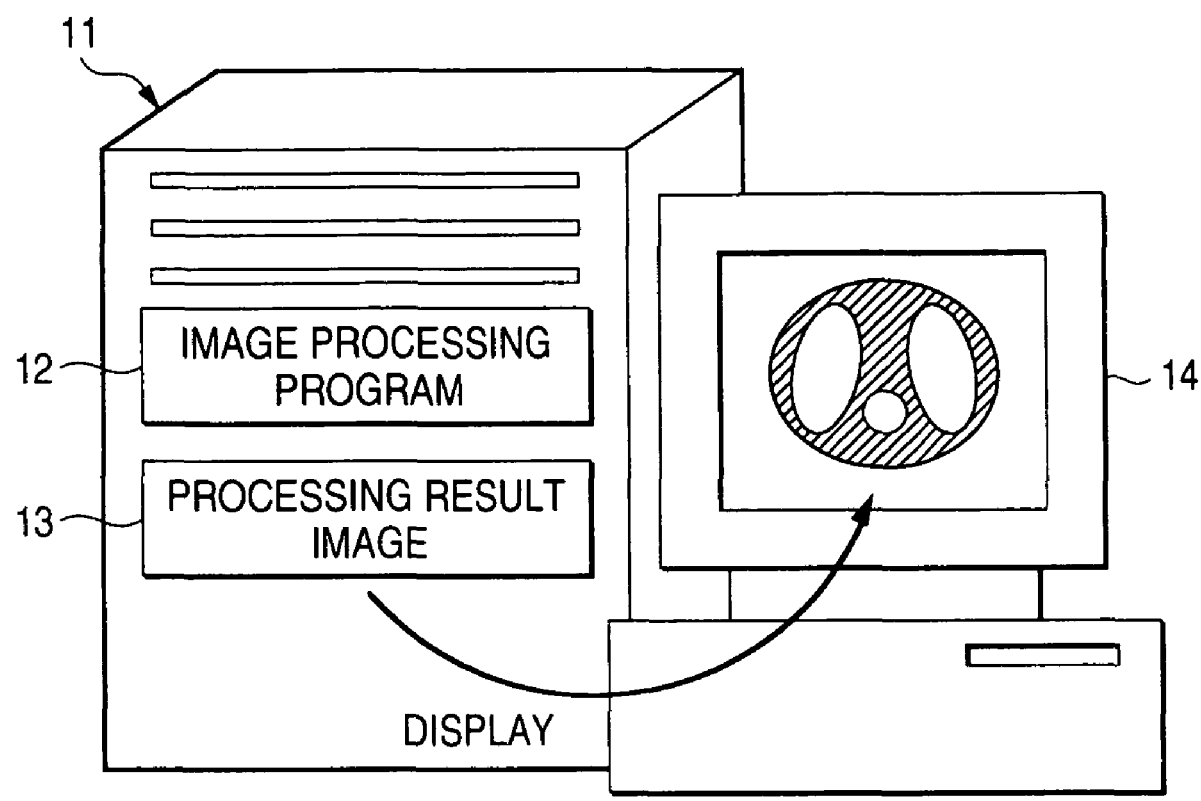
FIG. 5 shows state (1) of the client terminal 11 of a first embodiment when communication is disconnected.

FIG. 5 shows state (1) of the client terminal 11 of the first embodiment when communication is disconnected. The client terminal 11 of the first embodiment holds the processing result image 13 transmitted from the image processing server 15 before the disconnection of communication. Therefore, even when the communication is disconnected, if the same processing is requested, the cached processing result image 13 can be displayed intact on the display 14, whereby user can continue his/her work.

Figure 6:
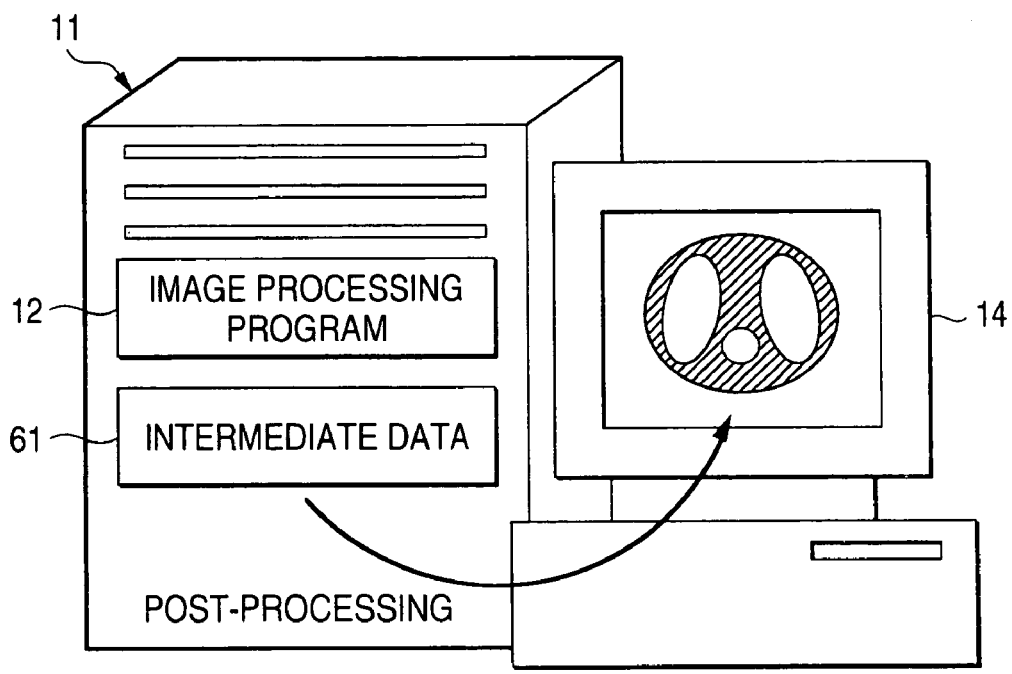
FIG. 6 shows state (2) of the client terminal 11 of a first embodiment when communication is disconnected.

FIG. 6 shows state (2) of the client terminal 11 of the first embodiment when communication is disconnected. The client terminal 11 of the first embodiment holds intermediate data 61 transmitted from the image processing server 15 before the disconnection of communication. A post-processing program is stored in an image processing program 12. Therefore, even when the communication is disconnected, if processing that can be handled in post-processing for the intermediate data 61 is requested, post-processing is performed for the saved intermediate data 61 and a processing result image is displayed on the display 14, whereby the work can be continued.

Figure 7:
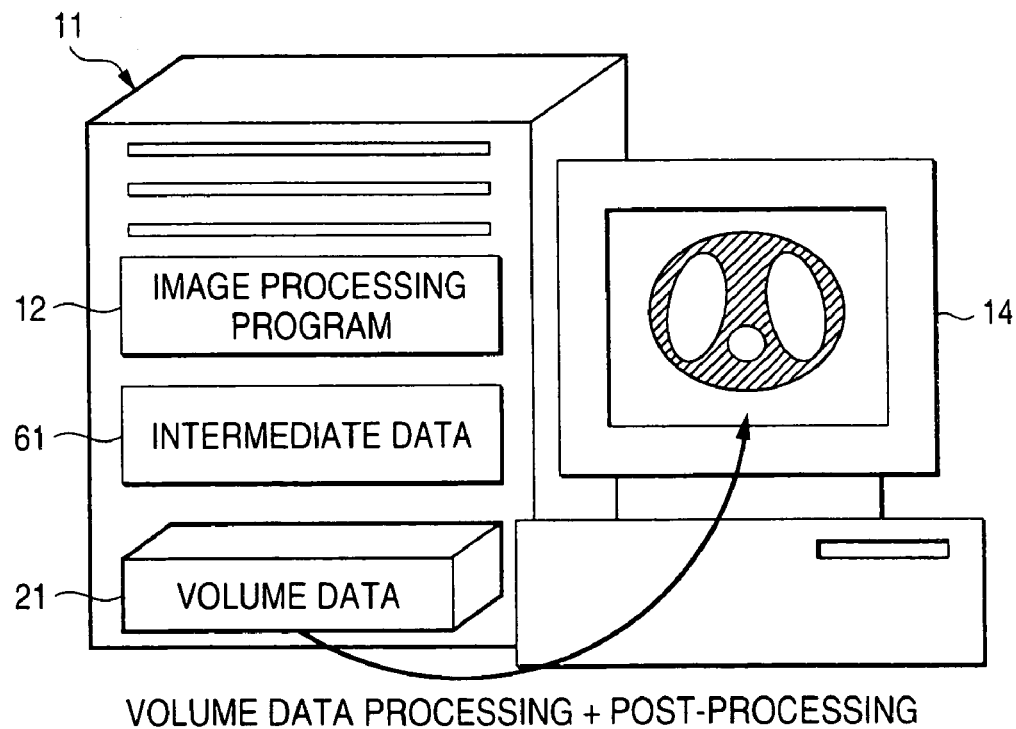
FIG. 7 shows state (3) of the client terminal 11 of a second embodiment when communication is disconnected.

FIG. 7 shows state (3) of the client terminal 11 of the second embodiment when communication is disconnected. The client terminal 11 of the second embodiment holds the volume data 21 transmitted from the image processing server 15 before the disconnection of communication and intermediate data 61 which is an intermediate format of the result of processing volume data 21. Volume data processing program and post-processing program are stored in an image processing program 12. Therefore, even when the communication is disconnected, if the processing that requires volume data processing is requested, volume data processing is performed using the saved volume data 21, and a processing result image is displayed on the display 14, whereby the work can be continued. The volume data processing refers to an image processing in which volume data is indispensable.

Figure 8:
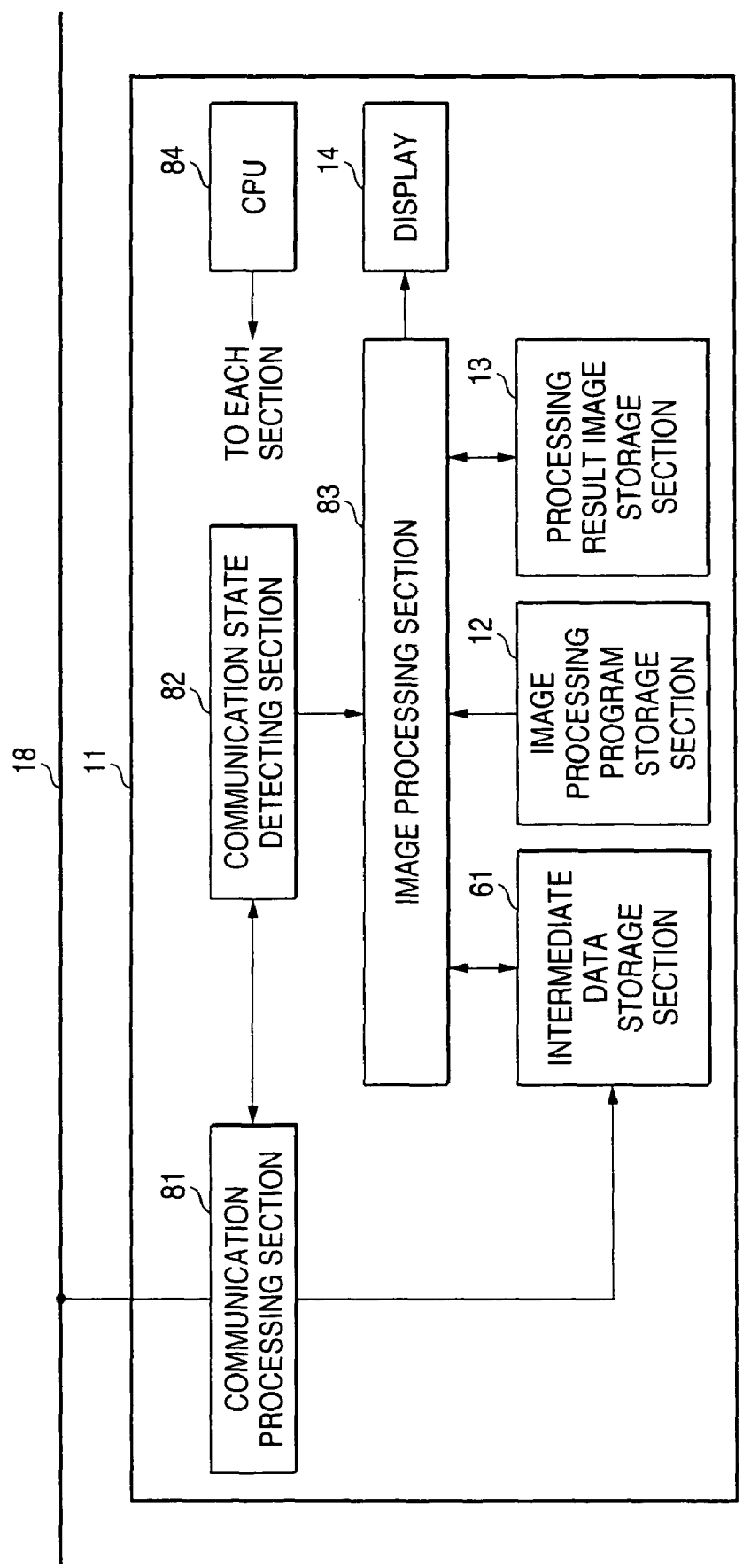
FIG. 8 is a block diagram to show a schematic configuration of the client terminal 11 according to a first embodiment.

FIG. 8 is a block diagram to show a schematic configuration of the client terminal 11 according to the first embodiment. The client terminal 11 of the first embodiment uses intermediate data which is processed based on an image processing request sent to the image processing server connected via the network 18, and includes a communication processing section 81 that transmits an image processing request and receives data such as a processing result image and the intermediate data which are sent from the image processing server 15, a communication state detecting section 82 that detects the connection state of the network 18, an intermediate data storage section 61 that stores intermediate data sent from the image processing server 15 and intermediate data of image processing in the client terminal 11, an image processing program storage section 12 that stores the post-processing program for the intermediate data, an image processing section 83 that performs post-processing in response to the connection state of the network 18 which is detected in the communication state detecting section 82, a processing result image storage section 13 that stores a processing result image generated in the image processing section 83, the display 14 that displays the processing result image, and a CPU 84 that controls the whole of the client terminal 11.

The client terminal 11 of the first embodiment does not have a function for holding volume data, and does not process volume data directly. Image from image processing server 15 is handled as intermediate data because it can be scaled up, down, etc., when it is displayed or redisplayed. In the first embodiment, post-processing is always performed in the client terminal 11.

In the client terminal 11, the intermediate data is saved together with a display condition. The client terminal 11 has a similar intermediate data retrieval function, and a similarity determining function.

A similar intermediate data is an intermediate data which is the same as, or similar to the intermediate data for displaying a desired image, and, when post-processing is performed, generates the same or almost the same image as the desired display image.

The similarity of intermediate data is determined based on the display condition stored with each intermediate data.

For example, if display conditions of two intermediate data are the same except for window/level or scale factor, the intermediate data are assumed to be the same.

If display conditions of two intermediate data are almost the same but slightly different in projection angle, resolution, interpolation format, image type, offset position or mask, the intermediate data are assumed to be similar.

If a plurality of similar intermediate data is found, the most similar one is selected. The selection may be made by assigning each parameter in display condition with a priority or weighting factor.

Using the similar intermediate data, an image close to the desired display image is generated through post-processing, in which window/level or scale factor is changed from the original display condition of the intermediate data. A display image may be generated through post-processing using the similar intermediate data under the display condition same as or similar to the original display condition.

In order to acquire the same or almost the same image as the desired display image to be generated by the job (image processing request), the job itself may be compared regarding similarity. While performing the job, the intermediate data is generated. Therefore, also the job itself may be compared. The case when the job is compared with a past job is described afterwards.

Figure 9:
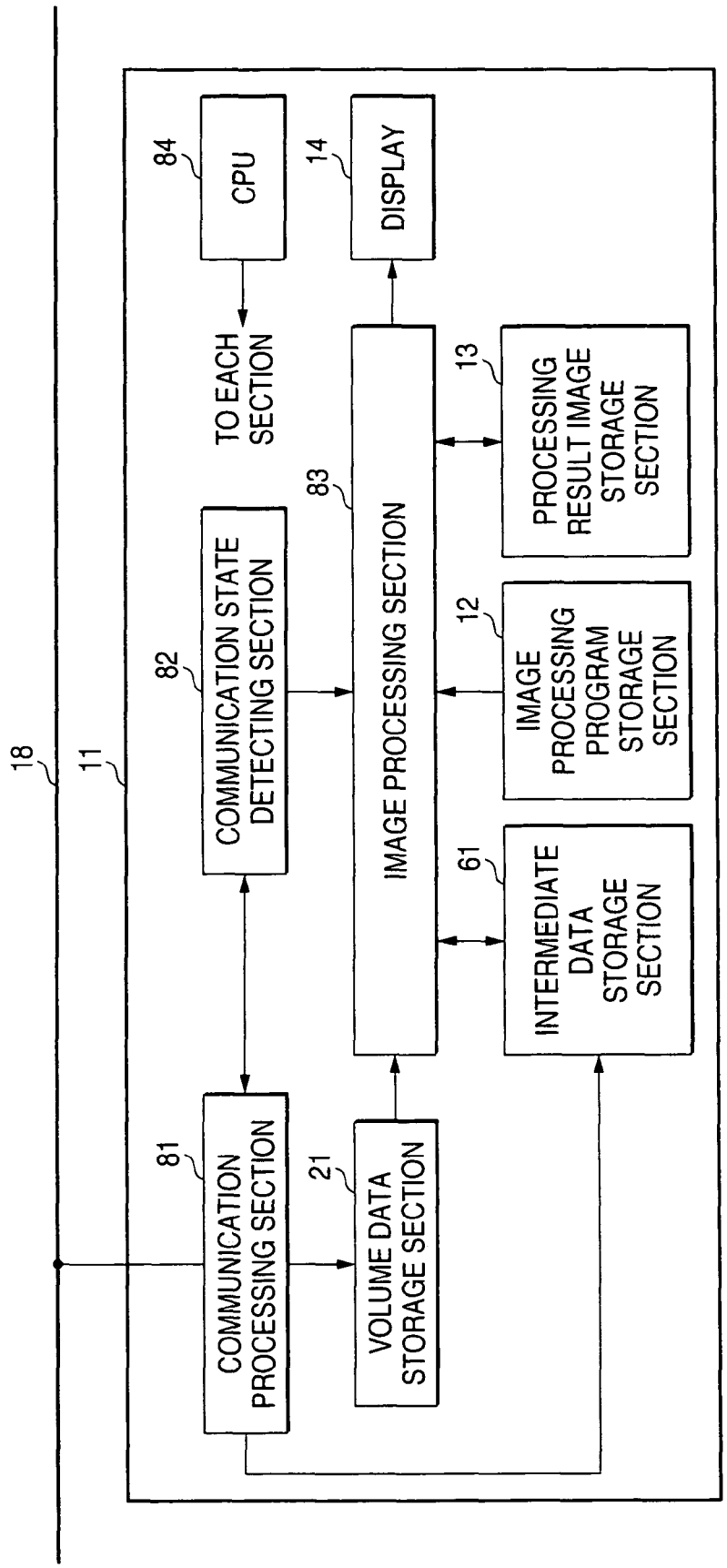
FIG. 9 is a block diagram to show a schematic configuration of the client terminal 11 according to a second embodiment.

FIG. 9 is a block diagram to show a schematic configuration of the client terminal 11 according to the second embodiment. The client terminal 11 of the second embodiment is provided by adding to the client terminal 11 of the first embodiment shown in FIG. 8 a volume data storage section 21 for storing volume data which is sent from the image processing server 15, and a volume data processing program for volume data to an image processing program storage section 12, so as to make it possible to perform volume data processing in an image processing section 83.

Since the client terminal 11 according to the second embodiment can perform volume data processing, volume data can be restored from intermediate data in the client terminal (refer to JP-A-2004-180923). Particularly, CT slice data or MPR (multi planar reconstruction) method is a method of directly observing the voxel value of volume data, and thus the intermediate data is an extracted element of volume data.

Thus, the volume data part element is stored in the client terminal, whereby a part of volume data can be restored. Since the user usually starts observation from the region of high interest, the possibility is high that the volume data part element stored by the method may contain a part of user's interest. In the method, a more important part of volume data for the user can be stored preferentially in the client terminal 11, so that it is convenient for the powerless client terminal 11 to perform processing.

If volume data has a missing part, the missing part is assumed to be a predetermined value (for example, 0). Alternatively, the missing part is interpolated from the surrounding data. Alternatively, the missing part is excluded from the calculation area, whereby volume rendering can be performed. Particularly, MPR (multi planar reconstruction) method or MIP (maximum intensity projection) can be processed with small calculation load. These processes can be executed in the client terminal 11 and thus it is convenient.

Figure 10:
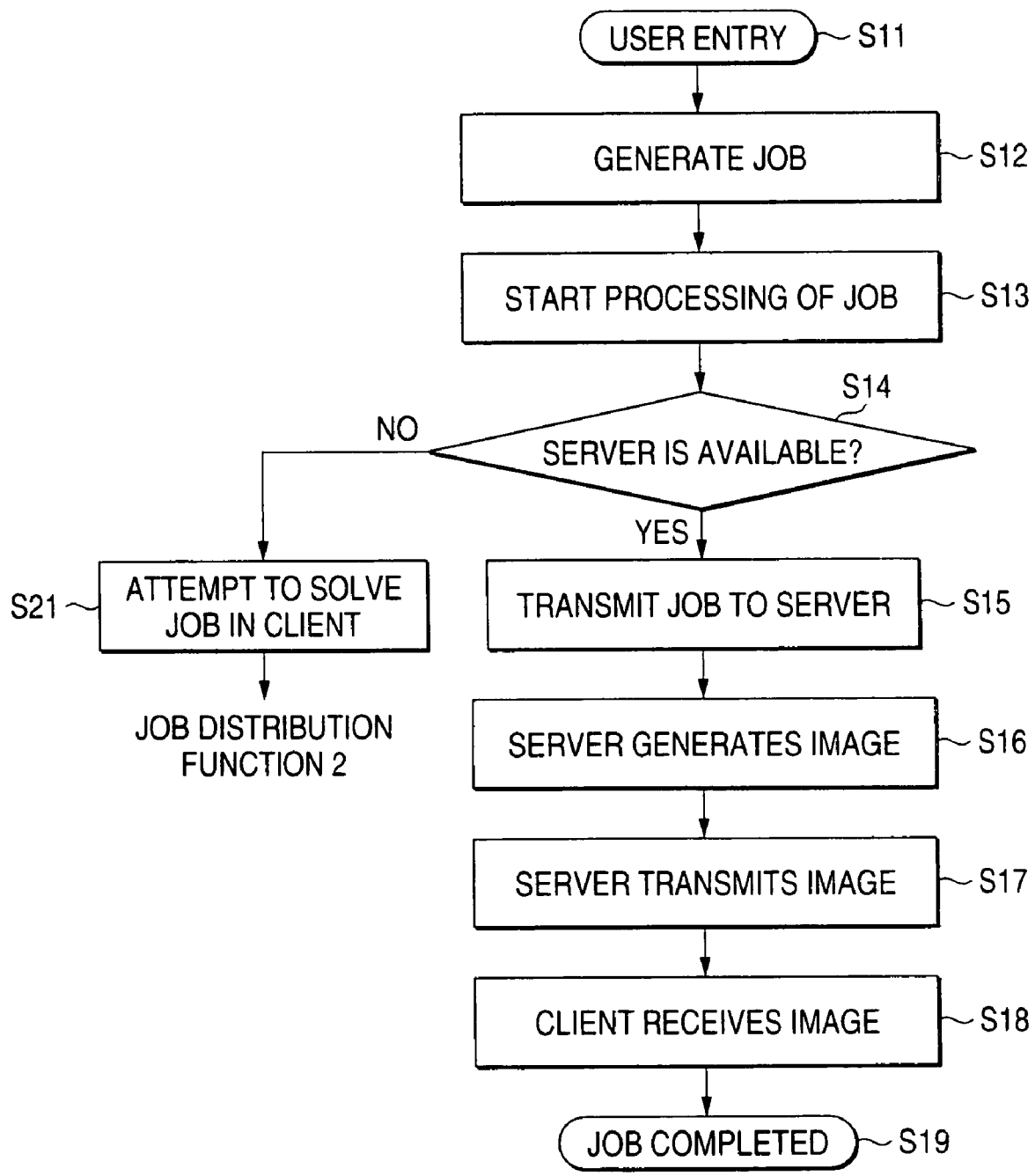
FIG. 10 is a flowchart to show a job distribution function (1a) in the client terminals 11 of first and second embodiments.

FIG. 10 is a flowchart to show a job distribution function (1a) in the client terminals 11 of the first and second embodiments. For example, if the user wants to see the CT image of a predetermined part of a human body, user entry is performed in which the user specifies the predetermined part (step S11) and a job is generated (step S12). When the client terminal 11 starts processing of the job (step S13), the CPU 84 determines whether or not the image processing server 15 is available based on the detection result of the communication state detecting section 82 (step S14). If the image processing server 15 is available (YES), the job is transmitted through the network 18 to the image processing server 15 (step S15). The job refers to a single image processing request sent to the image processing server 15.

The image processing server 15 calls up the data corresponding to the job from the volume data 16 and generates an image (step S16), and transmits the image via the network 18 to the client terminal 11 (step S17). The client terminal 11 receives the image (step S18), and displays the image on the display 14 and the job is completed (step S19). On the other hand, if the image processing server 15 is not available in step S14 (NO), an attempt is made to complete the job in the client terminal 11 (step S21).

Figure 11:
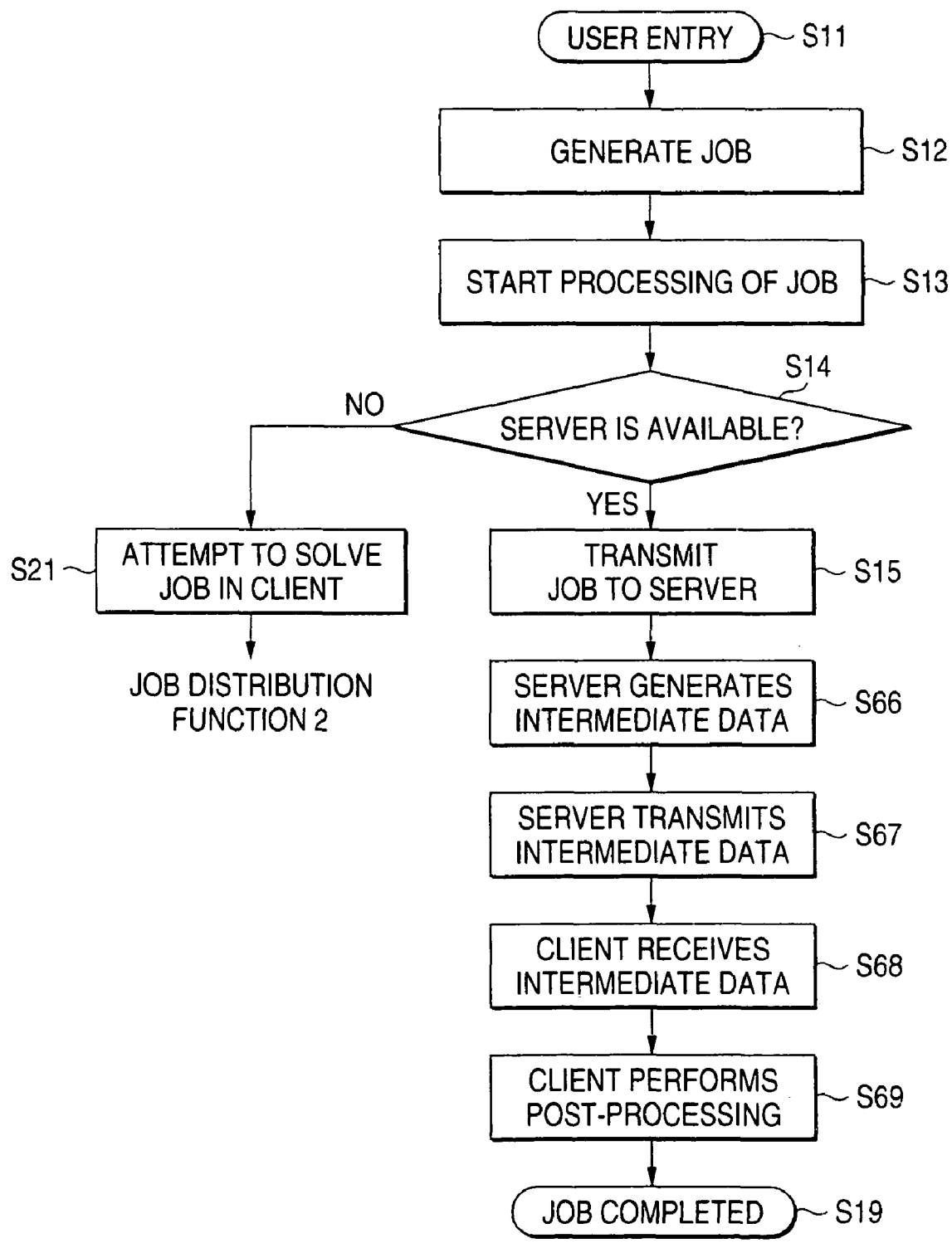
FIG. 11 is a flowchart to show a job distribution function (1b) in the client terminals 11 of first and second embodiments.

FIG. 11 is a flowchart to show a job distribution function (1b) in the client terminals 11 of the first and second embodiments. The flowchart of FIG. 11 differs from the flowchart of FIG. 10 in that the image processing server 15 transmits intermediate data to the client terminal 11. That is, the image processing server 15 performs image processing of the data corresponding to the job from the volume data 16 to generate intermediate data (step S66), and transmits the intermediate data via the network 18 to the client terminal 11 (step S67). The client terminal 11 receives the intermediate data (step S68), and performs post-processing (step S69), and displays the result of post-processing on the display 14 and the job is completed (step S19). On the other hand, if the image processing server 15 is not available in step S14 (NO), an attempt is made to complete the job in the client terminal 11 (step S21) as with the case in FIG. 10.

Figure 12:
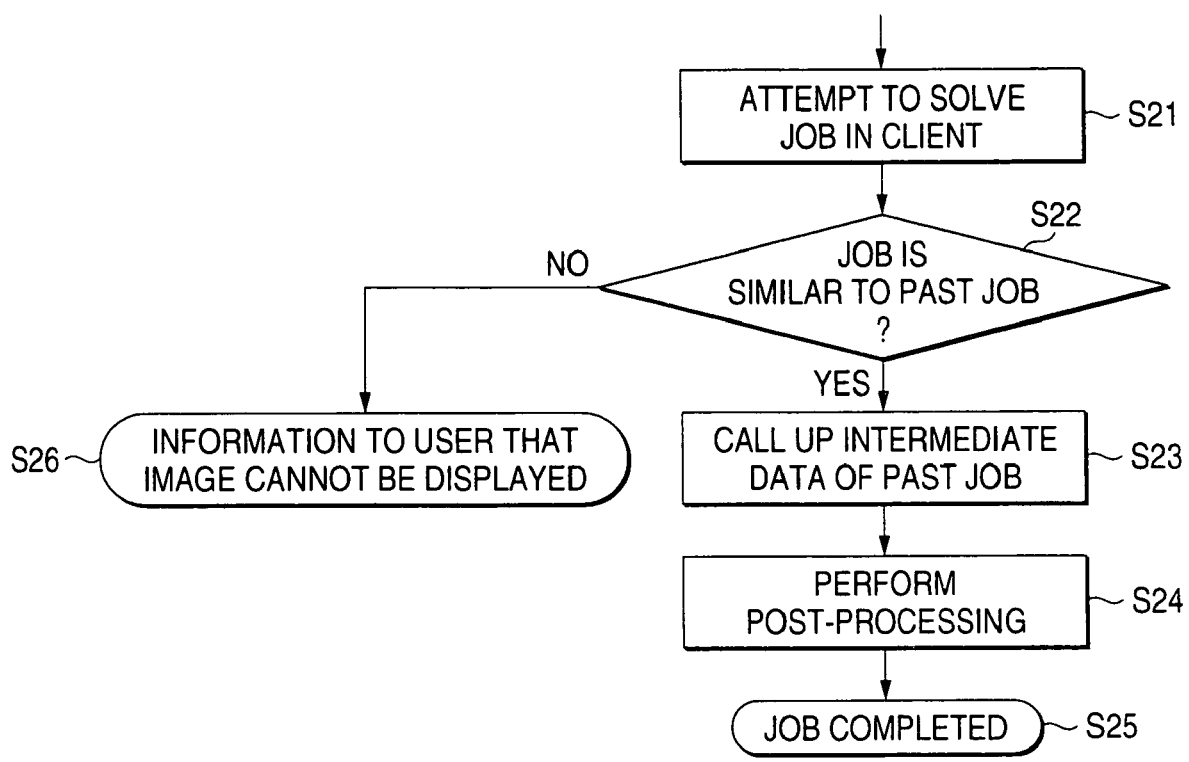
FIG. 12 is a flowchart for attempting to complete the job in the client terminal 11 of a first embodiment.

FIG. 12 is a flowchart for attempting to complete the job in the client terminal 11 of the first embodiment. FIG. 12 shows a job distribution function 2 in the client terminal when volume data processing cannot be performed. If the image processing server 15 is not available, the CPU 84 determines whether or not the job is similar to a past job (step S22). Geometry information, image type, opacity function, mask information, and the like are used in the determination.

If the job is similar to a past job (YES), the intermediate data of the past job is called up from the intermediate data storage section 61 (step S23), and post-processing for the intermediate data is performed in the image processing section 83 (step S24), and the job is completed (step S25).

On the other hand, if the job is not similar to a past job in step S22 (NO), the user is informed that an image cannot be displayed (step S26).

Figure 13:
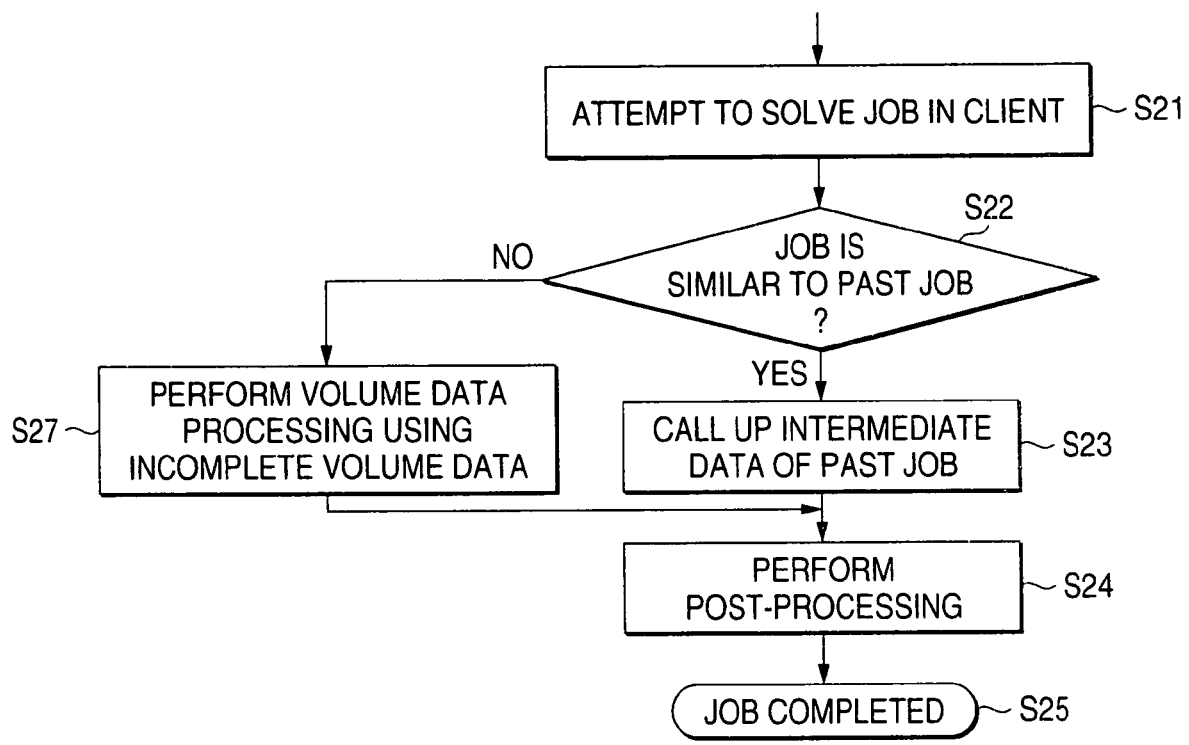
FIG. 13 is a flowchart for attempting to complete the job in the client terminal 11 of a second embodiment.

FIG. 13 is a flowchart for attempting to complete the job in the client terminal 11 of the second embodiment. FIG. 13 shows a job distribution function 2 in the client terminal when volume data processing can be performed. If the image processing server 15 is not available, the CPU 84 determines whether or not the job is similar to a past job (step S22). If the job is similar to a past job (YES), the intermediate data of the past job is called up from the intermediate data storage section 61 (step S23), and post-processing for the intermediate data is performed in the image processing section 83 (step S24) and the job is completed (step S25) as with the case in FIG. 12.

On the other hand, if the job is not similar to a past job in step S22 (NO), volume data processing is performed using incomplete volume data stored so far in the volume data storage section 21 (step S27), and further post-processing is performed (step S28) and the job is completed (step S25).

Figure 14:
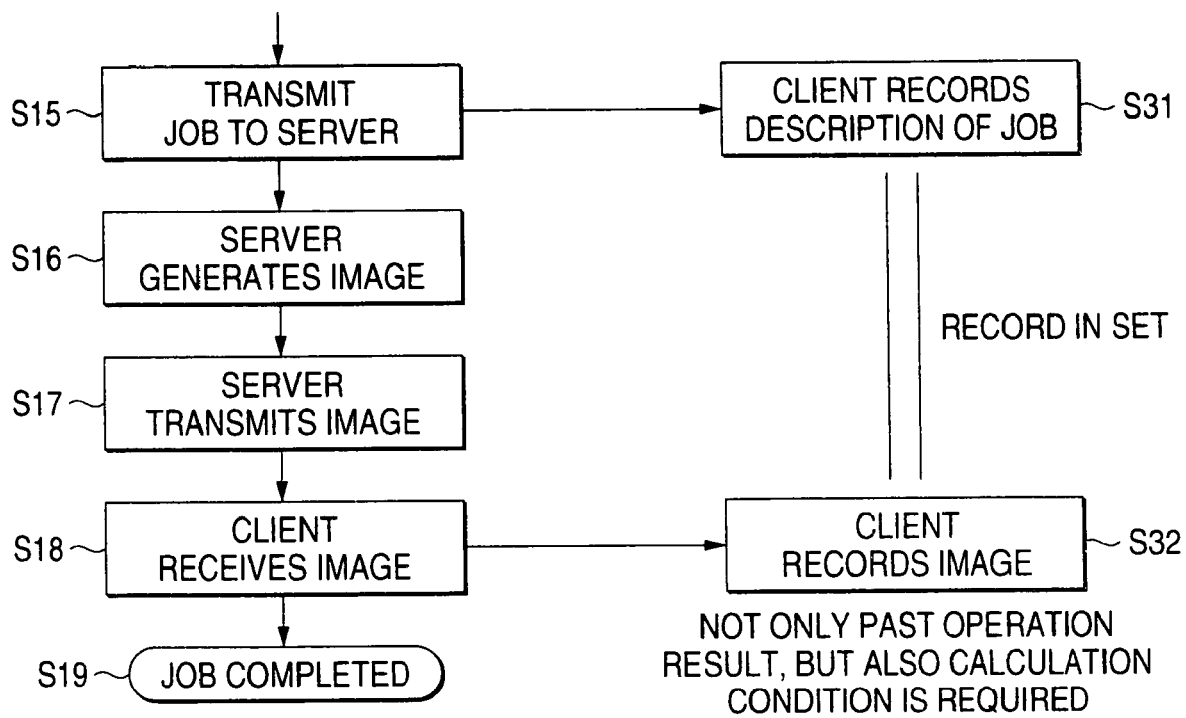
FIG. 14 is a flowchart to show storage (1) of result data in the client terminals 11 of first and second embodiments.

FIG. 14 is a flowchart to show storage (1) of result data in the client terminals 11 of the first and second embodiments. Steps S15 to S19 in FIG. 14 are the same as steps S15 to S19 in FIG. 10.

That is, in the client terminals 11 of the first and second embodiments, when the job is transmitted to the image processing server 15 at step S15, the description of the job is also recorded in the client terminal 11 (step S31). (The job is defined by the description of the job.) When the client terminal 11 receives the image transmitted from the image processing server 15 at step S18, the image is recorded in the client terminal 11 (step S32). The reason why the client terminal 11 records the description of the job and the image in a set is that not only the past operation result but also the calculation condition is required.

Figure 15:
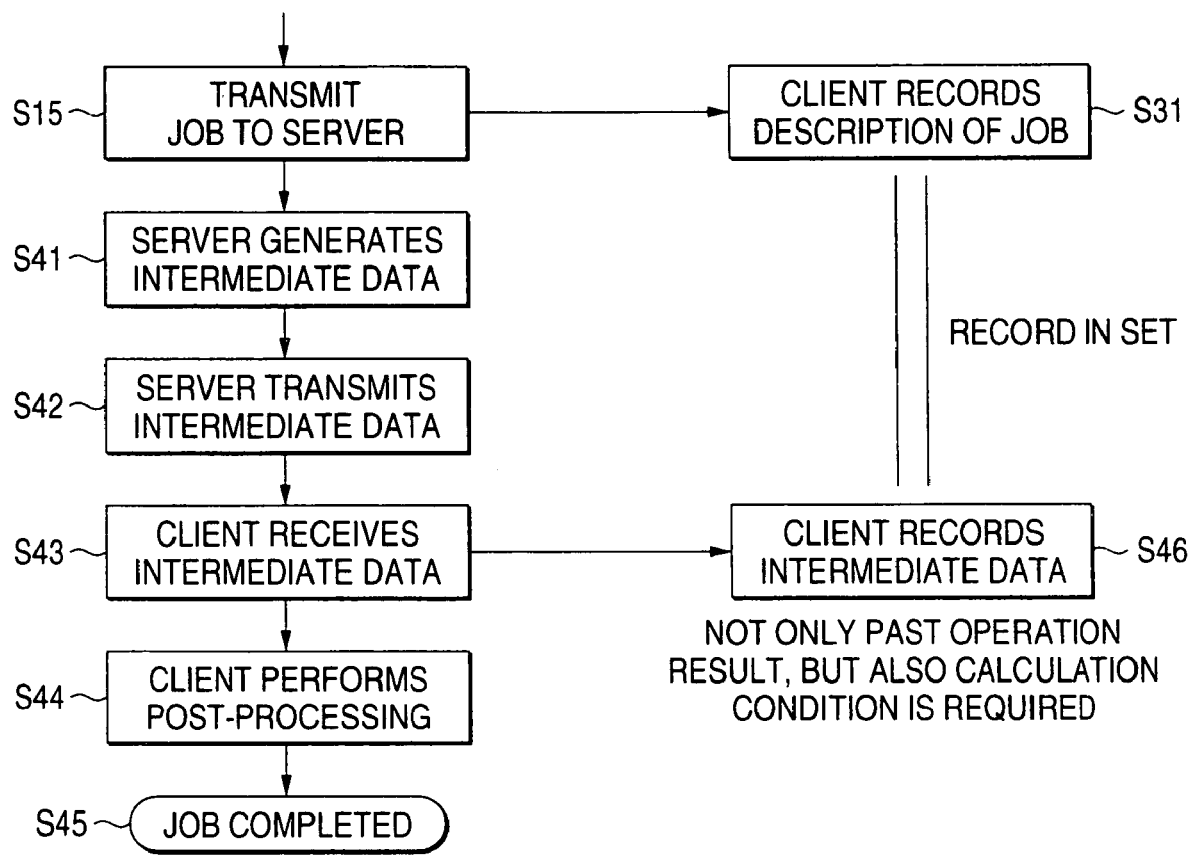
FIG. 15 is a flowchart to show storage (2) of result data in the client terminals 11 of first and second embodiments.
Figure 16:
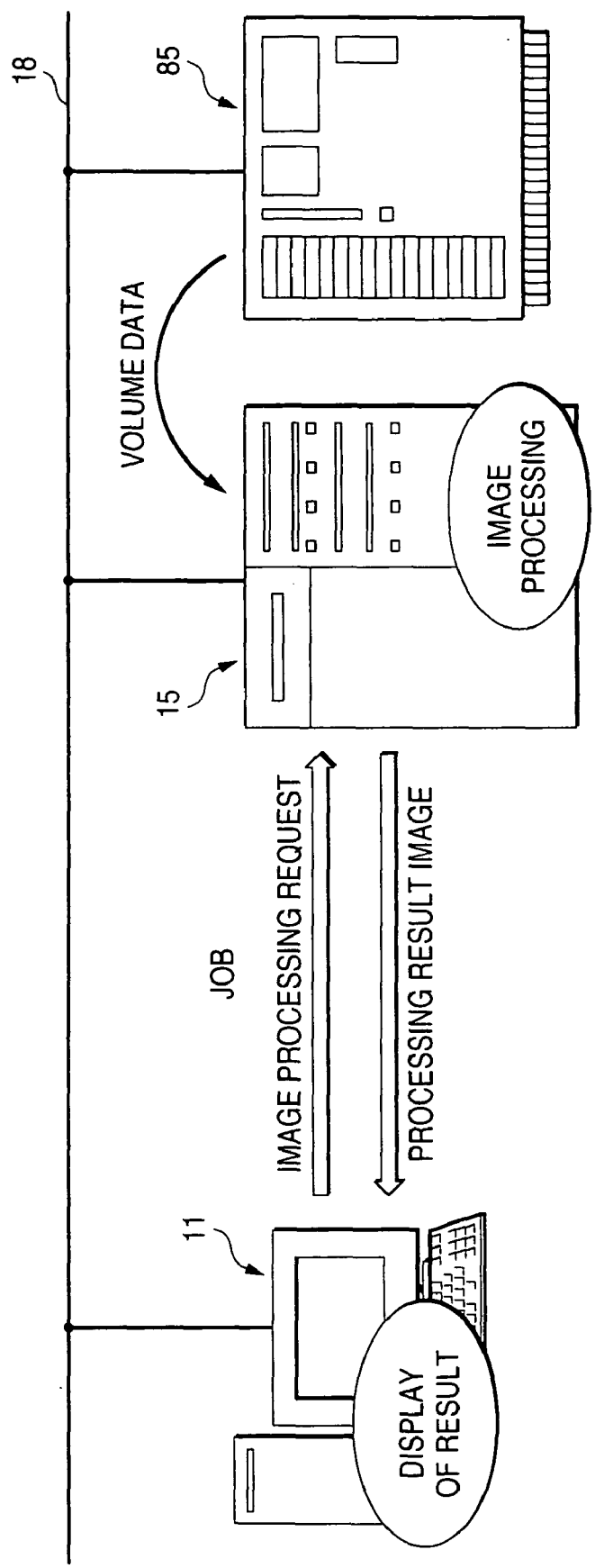
FIG. 16 shows an image processing system wherein a client terminal 11 and an image processing server 15 are connected via a network 18, and volume data is processed in the image processing server 15.
Figure 17:
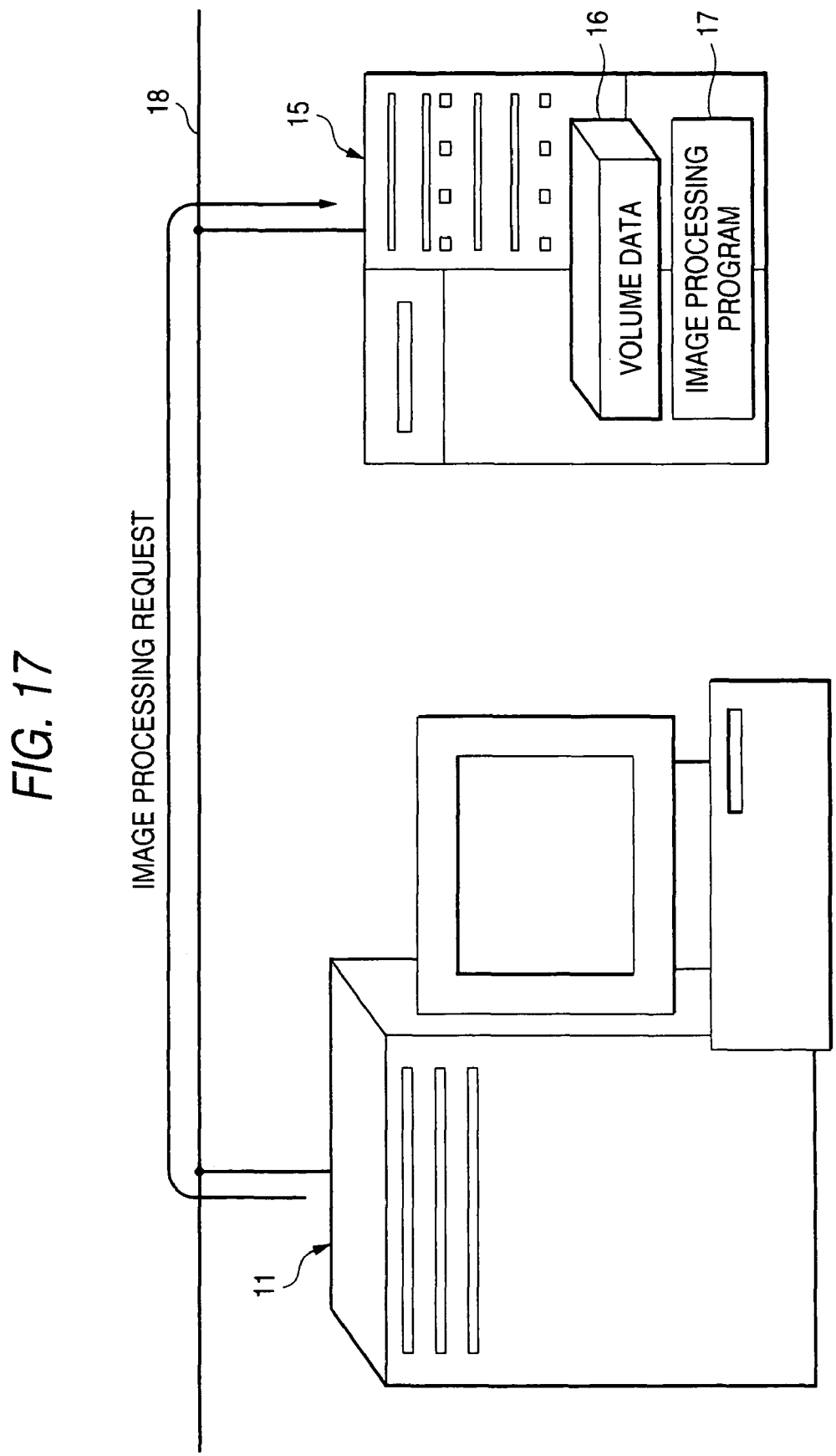
FIG. 17 shows a flow of data from the client terminal 11 to the image processing server 15 in the image processing system in a related art at normal time.
Figure 18:
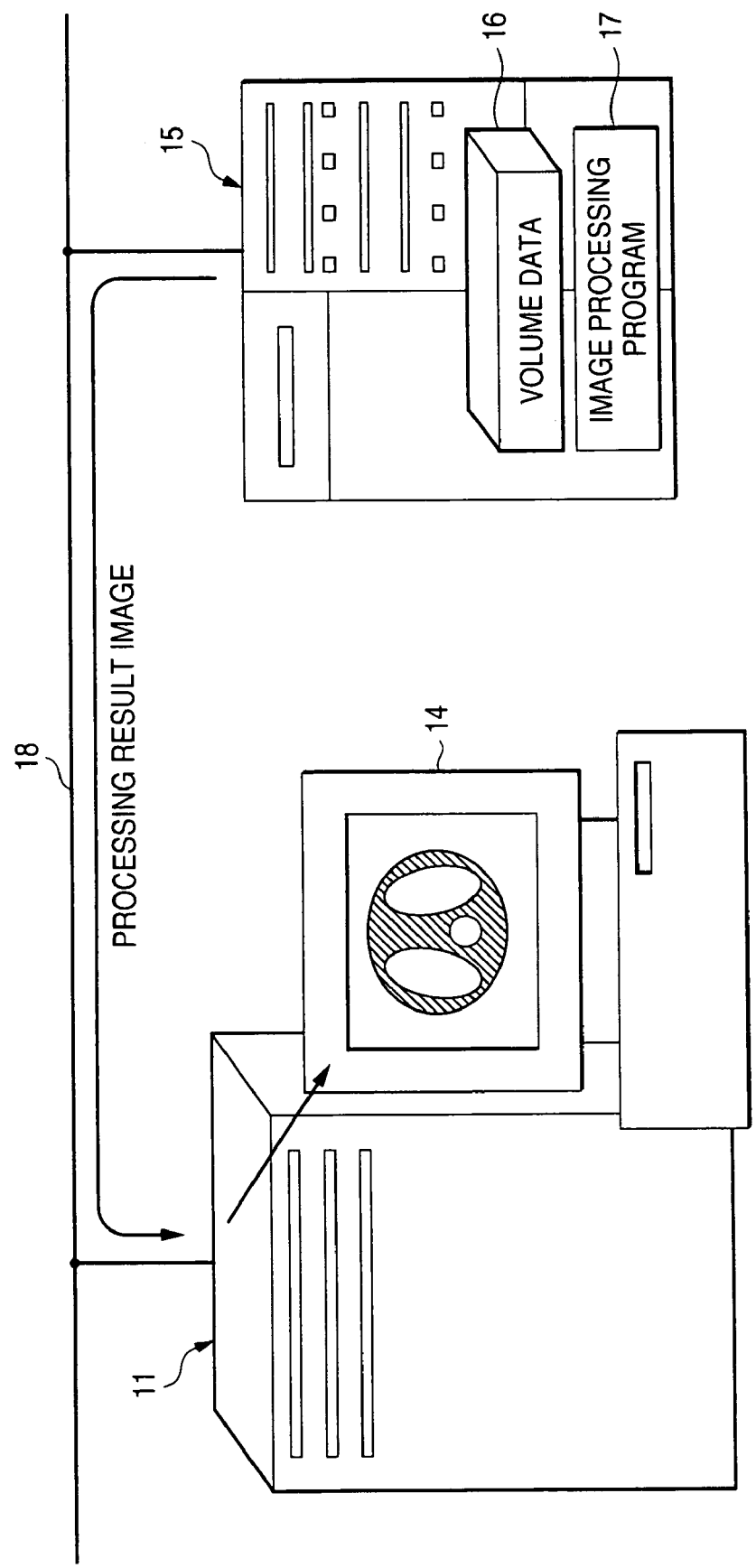
FIG. 18 shows a flow of data from the image processing server 15 to the client terminal 11 in the image processing system in a related art at normal time.
Figure 19:
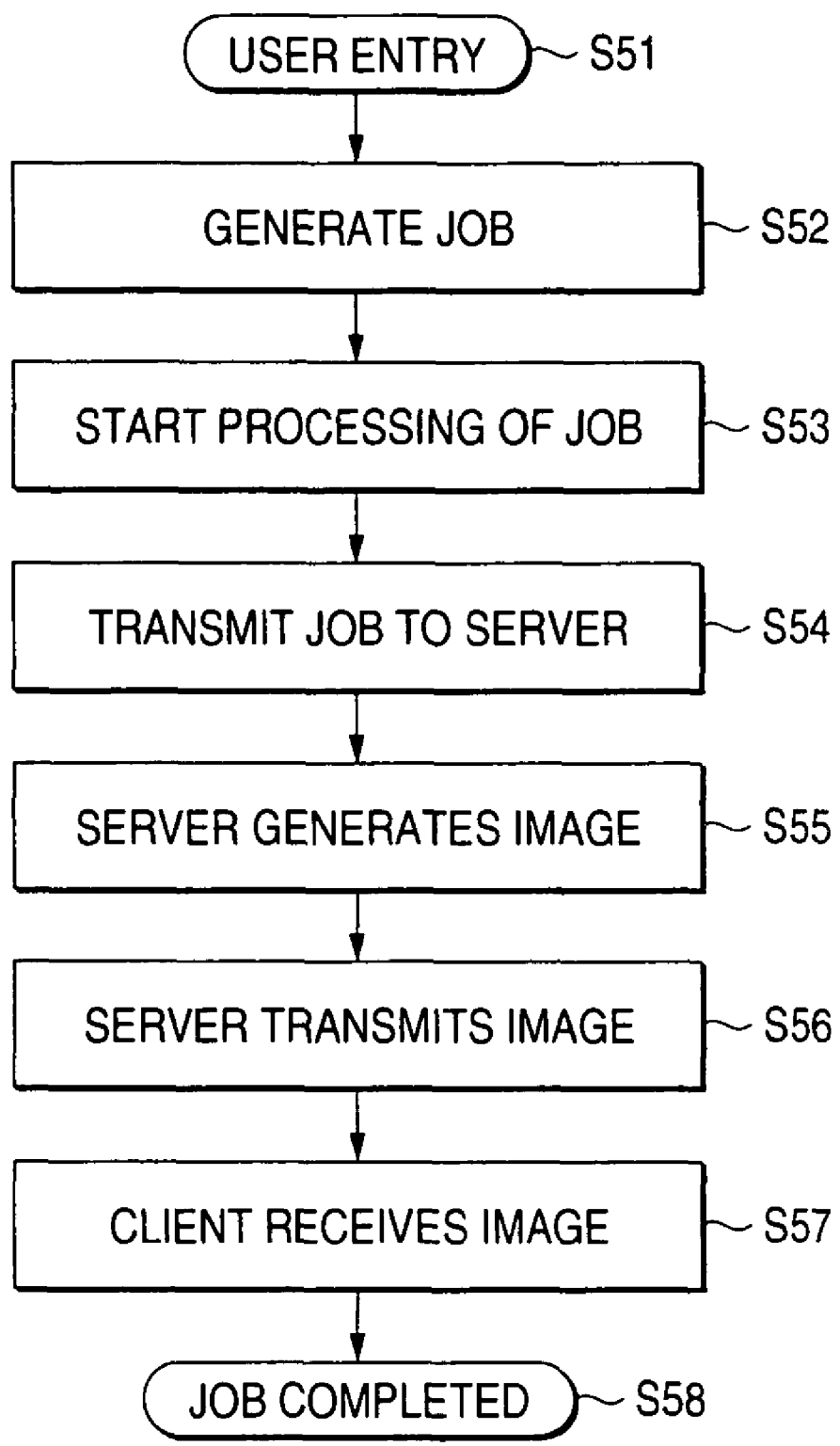
FIG. 19 is a flowchart for executing a job in the image processing system in a related art.

FIG. 15 is a flowchart to show storage (2) of result data in the client terminals 11 of the first and second embodiments. Steps S15 and S31 in FIG. 15 are the same as steps S15 and S31 in FIG. 14.

Also in this case, when the client terminal 11 transmits the job to the image processing server 15 at step S15, the client terminal 11 records the description of the job (step S31). Next, the image processing server 15 calls up the data corresponding to the job from the volume data 16 to generate intermediate data (step S41), and transmits the intermediate data via the network 18 to the client terminal 11 (step S42).

The client terminal 11 receives the intermediate data (step S43), and stores the received intermediate data in the intermediate data storage section 61 (step S46). Next, the image processing section 83 performs post-processing for the received intermediate data (step S44), and the job is completed (step S45). The reason why the client terminal 11 records the description of the job and the intermediate data in a set is that not only the past operation result, but also the calculation condition is required.

Thus, according to the image processing systems and the client terminals of the first and second embodiments, if a communication between the client terminal 11 and the image processing server 15 is disconnected, processing is switched automatically to processing of the client terminal 11 alone, and the work can be continued without interrupting the processing. The work can be smoothly continued still after the communication is recovered. This function is effective particularly when the client terminal 11 and the image processing server 15 are wirelessly connected.

In the image processing systems of the first and second embodiments, the image processing server is a single computer, but the image processing server may be a distributed image processing server constituted of a plurality of computers.

In the image processing systems of the first and second embodiments, the image processing server has the display function of a similar image. In order to display a similar image, a warning or a symbol may be displayed, the color may be changed or a sound may be produced so that the user can determine that the image is a similar image.

In the image processing systems of the first and second embodiments, the intermediate data is a data representing a voxel value. However, the intermediate data may be a voxel value to which change is added, mask information, region information, path, data before and after transform processing is performed, data before and after filtering processing is performed, text symbol, patent information, each layer of layered two-dimensional image, data before and after image synthesis is performed, coordinate information, etc. Further, an image after post-processing is performed may be used again as the intermediate data.

In the image processing systems of the first and second embodiments, a similar image is an intermediate data for which post-processing is performed so that almost the same image is provided. The similar image is not limited to intermediate data, and may be an image after post-processing is performed.

In the image processing systems of the first and second embodiments, processing is continued using the stored image, but a part or all of the stored images may be presented to the user for requesting the user to select any of the stored images for display.

In the image processing systems of the first and second embodiments, processing is continued using the stored image. However, operation of the user after disconnection is recorded, whereby when connection with the image processing server is recovered, the operation of the user can be reflected to recovery of the processing.

According to the invention, abnormality of the communication state is detected and processing for the image processing request is executed, whereby if a communication with the image processing server is disconnected in a client-server system, image processing in the client terminal is made possible, so that the user can continue work regardless of the communication state.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended Claims and their equivalents.

What is claimed is:

1. A communication terminal which communicates an image data via a communication line, said image data processed in an image processing server based on an image processing request sent to the image processing server, said communication terminal comprising:
   a communication state detecting section which detects a communication state between said communication terminal and said image processing server;
   an image processing section which detects an abnormality of said communication state, and executes an image processing for said image processing request when the abnormality is detected; and
   a usability determining section which determines whether intermediate data is usable for said image processing request or unusable for said image processing request, said intermediate data being in an intermediate format of an image calculated from a volume data, the volume data comprising voxel values,
   wherein when said usability determining section determines that the intermediate data is usable for said image processing request, said image processing section executes the image processing using said intermediate data.

2. The communication terminal as claimed in claim 1, further comprising:
   a data storage section which stores said image data.

3. The communication terminal as claimed in claim 2, wherein said stored image data includes said intermediate data.

4. The communication terminal as claimed in claim 1, wherein said intermediate data is a two-dimensional data.

5. The communication terminal as claimed in claim 1, wherein said image processing section selects a similar image based on the intermediate data by which an image similar to said image data is obtained.

6. The communication terminal as claimed in claim 1, wherein said image processing section performs a LUT (Look Up Table) transformation or a WL/WW (Window Level/Window Width) transformation.

7. The communication terminal as claimed in claim 1, wherein said image processing section performs an image measurement processing.

8. The communication terminal as claimed in claim 1, wherein said image processing section performs an affine transformation.

9. The communication terminal as claimed in claim 1, wherein said image processing section executes a volume data processing.

10. The communication terminal as claimed in claim 9, wherein said image processing section executes a volume rendering.

11. The communication terminal as claimed in claim 9, further comprising:
a volume data generating section which generates a volume data from said intermediate data for executing said volume data processing.

12. The communication terminal as claimed in claim 2, wherein said data storage section includes a volume data storage section which stores a volume data being compressed among the image data, and said image processing section executes a volume data processing using the stored volume data.

13. A computer readable medium having a set of instructions for controlling a communication terminal which communicates an image data via a communication line, said image data processed in an image processing server based on an image processing request sent to the image processing server, said set of instructions comprising:
(a) detecting a communication state between said communication terminal and said image processing server;
(b) detecting an abnormality of said communication state;
(c) executing an image processing for said image processing request when the abnormality is detected; and
(d) determining whether intermediate data is usable for said image processing request or unusable for said image processing request, said intermediate data being in an intermediate format of an image calculated from a volume data, the volume data comprising voxel values,
wherein when (d) determines that the intermediate data is usable for said image processing request, said intermediate data is used in (c).

14. The computer readable medium as claimed in claim 13, said set of instructions further comprising:
storing said image data.

15. The computer readable medium as claimed in claim 13, wherein said stored image data includes said intermediate data.

16. The computer readable medium as claimed in claim 13, wherein a similar image is selected in (c) based on the intermediate data by which an image similar to said image data is obtained.

17. A communication terminal comprising:
a communication processing section that transmits an image processing request to an image processing server connected via a network, and receives an image data from the image processing server;
a communication state detecting section that detects the connection state between the communication terminal and the image processing server;
an intermediate data storage section that stores intermediate data included in the image data sent from the image processing server and intermediate data generated by performing image processing in the communication terminal, said intermediate data being in an intermediate format of an image calculated from a volume data included in the image data, the volume data comprising voxel values;
an image processing program storage section that stores a post-processing program which uses the intermediate data for the image processing in the communication terminal;
a usability determining section which determines whether said intermediate data is usable for said post-processing program or unusable for said post-processing program;
an image processing section that, if the usability determining section determines that said intermediate data is usable, performs said post-processing program in response to the connection state;
a processing result image storage section that stores an image generated in the image processing section; and
a CPU (Central Processing Unit) that controls the whole of the communication terminal.

18. The communication terminal as claimed in claim 17, further comprising:
a volume data storage section that stores said volume data included in the image data which is sent from the image processing server,
wherein the image processing program storage section further stores a volume data processing program which uses the volume data, and volume data processing is performed in the image processing section in response to the connection state.

* * * * *